United States Patent
Hwang et al.

(10) Patent No.: US 7,495,750 B2
(45) Date of Patent: Feb. 24, 2009

(54) MONITORING DEVICE FOR ROTATING BODY

(75) Inventors: Yoha Hwang, Seoul (KR); Sang Bae Lee, Seoul (KR); Jong Min Lee, Gyeonggi-do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 12/081,675

(22) Filed: Apr. 18, 2008

(65) Prior Publication Data

US 2008/0204707 A1 Aug. 28, 2008

Related U.S. Application Data

(63) Continuation of application No. PCT/KR2006/004850, filed on Nov. 17, 2006.

(30) Foreign Application Priority Data

May 26, 2006 (KR) .................. 10-2006-0047393

(51) Int. Cl.
*G01B 11/16* (2006.01)
(52) U.S. Cl. ......................... 356/32; 356/614
(58) Field of Classification Search .............. None
See application file for complete search history.

(56) References Cited

U.S. PATENT DOCUMENTS

2005/0253051 A1 11/2005 Hwang et al.
2007/0289741 A1* 12/2007 Rambow ............... 166/250.01

FOREIGN PATENT DOCUMENTS

| JP | 11-201735 A | 7/1999 |
| JP | 2001-183114 A | 7/2001 |
| KR | 10-2000-0074372 A | 12/2000 |
| KR | 10-2001-0002906 A | 1/2001 |
| KR | 10-2003-0093739 A | 12/2003 |
| KR | 10-2005-0109191 A | 11/2005 |

\* cited by examiner

*Primary Examiner*—Michael P Stafira
(74) *Attorney, Agent, or Firm*—Bacon & Thomas, PLLC

(57) ABSTRACT

The present invention relates to a monitoring device for a rotating body, which can accurately measure signals from a fiber Bragg grating sensor provided on the rotating body by compensating a transmission loss variation and a distortion of the sensor signals. A rotation-side optical fiber has at least one deformation sensor at a portion thereof and a reference sensor at one end thereof. The sensors are made by forming a Bragg grating in the rotation-side optical fiber. A fixed-side optical fiber is mounted to the fixed body so as to be opposed to the one end of the rotation-side optical fiber. A signal processing unit detects a deformation of the rotating body by subtracting a signal corresponding to the light reflected from the reference sensor from a signal corresponding to the light reflected from the deformation sensor.

16 Claims, 9 Drawing Sheets

MONITORING DEVICE FOR ROTATING BODY

This application is a Continuation Application of PCT International Application No. PCT/KR2006/004850 filed on Nov. 17, 2006, which designated the United States.

TECHNICAL FIELD

The present invention relates to a monitoring device for a rotating body, and more particularly to a monitoring device that detects deformation or defect of a rotating body such as a flywheel, a rotor of a helicopter, a blade of a wind generator, etc. by using fiber Bragg grating sensors.

BACKGROUND OF THE INVENTION

A rotating body such as a flywheel of a flywheel energy storage system, a rotor of a helicopter, a turbine blade, etc. plays an essential role in a mechanical apparatus. Accordingly, it is very important to prevent unexpected accidents by constantly monitoring the rotating body and detecting any indication of breakdown in advance. However, in order to accurately monitor the rotating body during its operation, sensors must be directly mounted to the rotating body. In such a case, there is a problem in that it is difficult to supply power to the sensors and transmit the detected signals outwardly.

As one of the currently used methods for monitoring a rotating body, there is a method using a slip ring, which collects cables of the sensors mounted to the rotating body and connects them like a brush of a DC motor. However, there is a problem with such a method in that each cable must be connected individually. Further, since a rotating member and a fixed member must be successively contacted to each other, other problems related to wear, noise, maximum speed restriction of the rotating body and the like take place due to such contact. Moreover, if the rotating body has a plurality of points to be monitored such as a turbine, then the installation and wiring of the slip ring become highly limited.

There is another method wherein a signal processing device and a battery (in addition to the sensors) are integrated in the rotating body and become wirelessly connected to the outside. However, the battery must be periodically replaced. Further, mounting the above monitoring equipment to the high-speed rotating body can be extremely difficult due to the weight and size of the equipment.

Further, considering such a problem, an indirect measuring method is used wherein the rotating body is monitored by using the sensors equipped outside the rotating body. In this method, vibration is measured and analyzed by using an accelerometer, which is mounted to a housing of a bearing, or a gap sensor that detects the vibration of the rotating body. However, since it is very difficult to show a link between the vibration signals and the indications of defect or breakdown of the rotating body and to further detect the abnormalities of the rotating body at an initial step in the above indirect monitoring method, regular maintenances considering numerous safety factors are performed at many fields. Thus, there is a problem in that an enormous expense and manpower are needed due to the excessive maintenance.

As a solution for the above-mentioned problems, Korean Patent Publication No. 10-2005-109191 (filed on May 14, 2004 by the present applicant) discloses a monitoring device for a rotating body comprising the following: a light source for emitting a multi-wavelength light; an optical fiber connected to the light source and being extended to oppose a center of a rotating shaft at its one end; a fiber Bragg grating sensor mounted to the rotating body, the fiber Bragg grating sensor being positioned so that its one end is located at a center of the one end of the rotating shaft and is opposed to the one end of the optical fiber, the fiber Bragg grating sensor reflecting light with wavelength corresponding to deformation of the rotating body in response to the light transmitted via the optical fiber; and a signal processing unit connected to the optical fiber, the signal processing unit receiving the light reflected from the fiber Bragg grating sensor via the optical fiber and calculating the deformation of the rotating body based upon the reflected light.

However, there are two problems with the prior art monitoring device for a rotating body. One problem is that transmission loss, which necessarily occurs when light signals move between a rotating body and a fixed body via a space, is varied in intensity depending on a rotation angle. If the transmission loss of the light signals is constant irrespective of the rotation angle, then no problems occur. However, it is very difficult to mount the collimating and focusing members to the rotation-side and the fixed-side, respectively, so that their centers are exactly in a line. Further, it is very difficult to make the collimating and focusing members to transmit completely parallel light signal between the rotation-side and the fixed-side. Therefore, rotation of the rotating shaft changes the transmission loss of the light signals between the rotation-side and the fixed-side according to the rotation angle, thereby highly distorting signals from the Bragg grating sensors mounted to the rotating body.

FIGS. 10A and 10B are graphs of a total light quantity, which shows the transmission loss variation of the signals from the Bragg grating sensors according to the rotation angle variation of the rotating body. The total light quantity is obtained by measuring the light signals reflected from each sensor in the rotating body at the fixed-side after one optical fiber with a plurality of Bragg grating sensors is mounted to the rotating body and a broadband signal is then transmitted from the fixed-side to the rotation-side. FIG. 10A shows the transmission loss variation of the light signals according to the rotation angle of 0°~360° as an x-y graph. FIG. 10B shows the transmission loss variation of the light signals according to the rotation angle of 0°~360° as an angular graph. Since the transmission loss of the light signals is constant irrespective of the rotation angle in case of ideal connection, y-axis values of FIG. 10A must be constant and a circle must be made in FIG. 10B. However, it can be seen that the light quantity is highly varied according to the variation of the rotation angle. The graphs of FIGS. 10A and 10B show that the total light quantity reflected from the sensors is measured. However, separately measuring the intensity of the light of the specific wavelength reflected from each sensor also shows the same pattern of the variation of the transmission loss as the above graphs. When measuring strain by means of optical sensors, the intensity of the specific wavelength (light quantity) must be measured. Since the variation of the light quantity according to the rotation angle of the rotating body is high as described above, it must be certainly compensated.

The other problem is that temperature must be accurately measured considering the characteristic of the optical fiber (i.e., wavelengths reflected from the Bragg grating sensors are varied according to temperature) and the characteristic change according to the temperature variation must be compensated. The wavelength variation of the Bragg grating sensor is sensitive to temperature as well as strain. Therefore, there is a need to accurately measure the temperature of the sensor portion and to calculate the wavelength variation caused by the temperature as well as to compensate it in order to calculate the accurate strain.

SUMMARY OF THE INVENTION

Therefore, it is an object of the present invention to overcome the problems of the prior art and provide a monitoring device for a rotating body, which uses fiber Bragg grating sensors, and which can accurately measure signals from the fiber Bragg grating sensor provided on the rotating body by compensating a transmission loss variation of a sensor signal according to rotation angle of a rotating body and a distortion of the sensor signal according to temperature.

Consistent with the foregoing object and in accordance with the invention as embodied broadly herein, there is provided a monitoring device for a rotating body, which is rotatably provided apart from a fixed body. The monitoring device comprises the following: a light source for emitting light; a rotation-side optical fiber attached to a deformation-measuring part of the rotating body and being extended toward one end of the rotating body so that one end of the rotation-side optical fiber is placed on a rotational axis of the rotating body; at least one deformation sensor made by forming a plurality of Bragg gratings in a portion of the rotation-side optical fiber along its lengthwise direction, the portion of the rotation-side optical fiber being attached to the deformation-measuring part of the rotating body; a reference sensor made by forming a plurality of Bragg gratings on the rotation-side optical fiber along its lengthwise direction adjacent to the one end of the rotation-side optical fiber located at the one end of the rotating body; a fixed-side optical fiber connected to the light source and being mounted to the fixed body so as to be opposed to the one end of the rotation-side optical fiber; and a signal processing unit connected to the fixed-side optical fiber, the signal processing unit receiving the light reflected from the deformation sensor and the reference sensor, the signal processing unit detecting a deformation of the rotating body by subtracting a signal corresponding to the light reflected from the reference sensor from a signal corresponding to the light reflected from the deformation sensor.

The reference sensor is disposed on the rotational axis of the rotating body or is disposed on a surface of the rotating body. Preferably, the reference sensor is wrapped by a packing member, which prevents the reference sensor from being deformed by a rotation of the rotating body.

The monitoring device may further comprise at least one temperature sensor, which is made by forming a plurality of Bragg gratings on a portion of the rotation-side optical fiber along its lengthwise direction. The reference sensor is combined with the temperature sensor. The temperature sensor is disposed on the rotational axis of the rotating body or is disposed on a surface of the rotating body adjacent to the deformation sensor. Preferably, the temperature sensor is wrapped by a packing member, which prevents the temperature sensor from being deformed by a rotation of the rotating body.

An optical circulator is provided between the light source and the signal processing unit.

The signal processing unit includes: an optical coupler for receiving the light reflected from the deformation sensor, the reference sensor and the temperature sensor; a plurality of signal processing lines connected to the optical coupler, each signal processing line processing the signals corresponding to the light reflected from the deformation sensor, the reference sensor and the temperature sensor; and a calculating portion for calculating a strain of the rotating body by subtracting the signal of the reference sensor and the signal of the temperature sensor from the signal of the deformation sensor outputted from the plurality of the signal processing lines.

Each signal processing line includes: a tunable filter for changing the wavelength variations of the sensors to the light quantity variations; a photo diode for changing the light quantity variation outputted from the tunable filter to an electrical signal; an amp for amplifying the electrical signal; and an A/D converter for converting the amplified electrical signal to a digital signal and outputting the digital signal to the calculating portion.

BRIEF DESCRIPTION OF THE DRAWINGS

The above object and features of the present invention will become more apparent from the following description of the embodiments given in conjunction with the accompanying drawings.

DETAILED DESCRIPTION OF THE EMBODIMENT

The embodiments of the present invention will now be described in detail with reference to the accompanying drawings.

Figure 1:
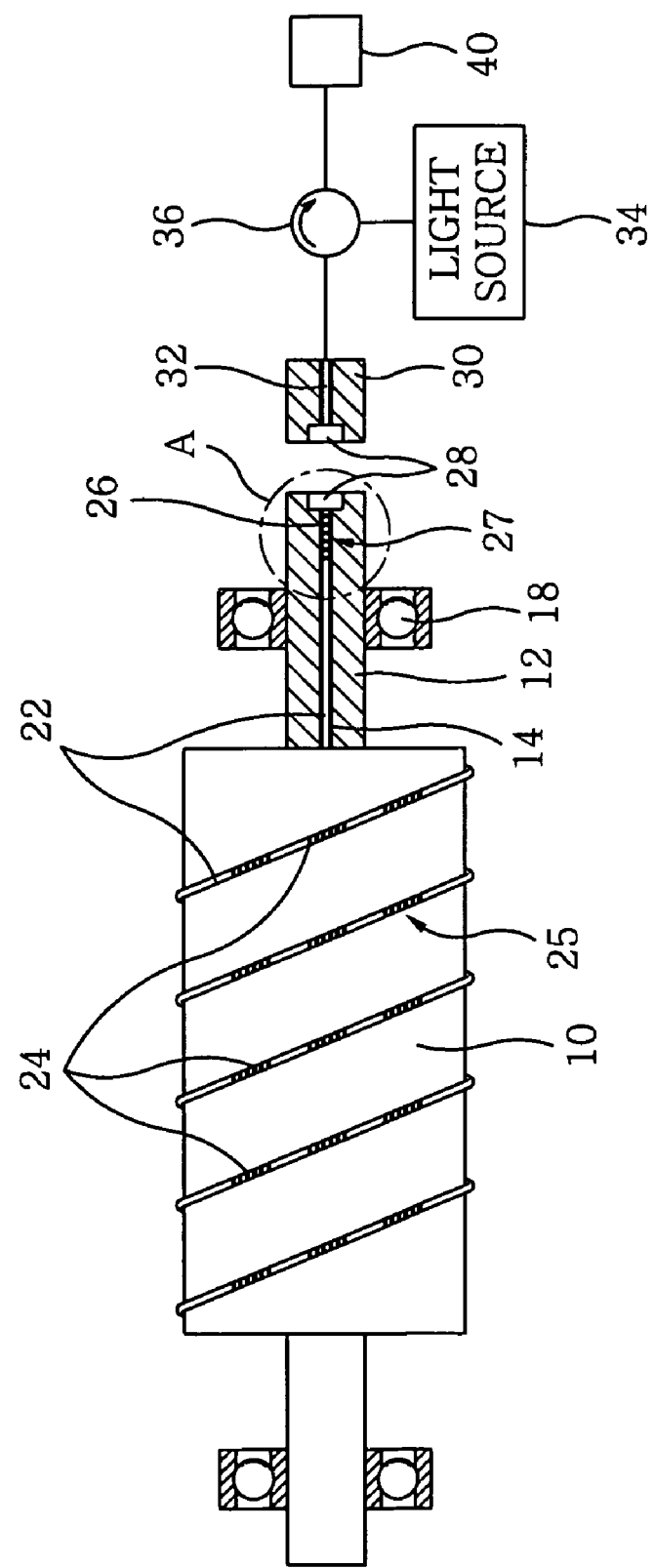
FIG. 1 is a side and partially sectional view showing a schematic constitution wherein a monitoring device for a rotating body, which is constructed in accordance with one embodiment of the present invention, is installed to a rotating body.
Figure 2:
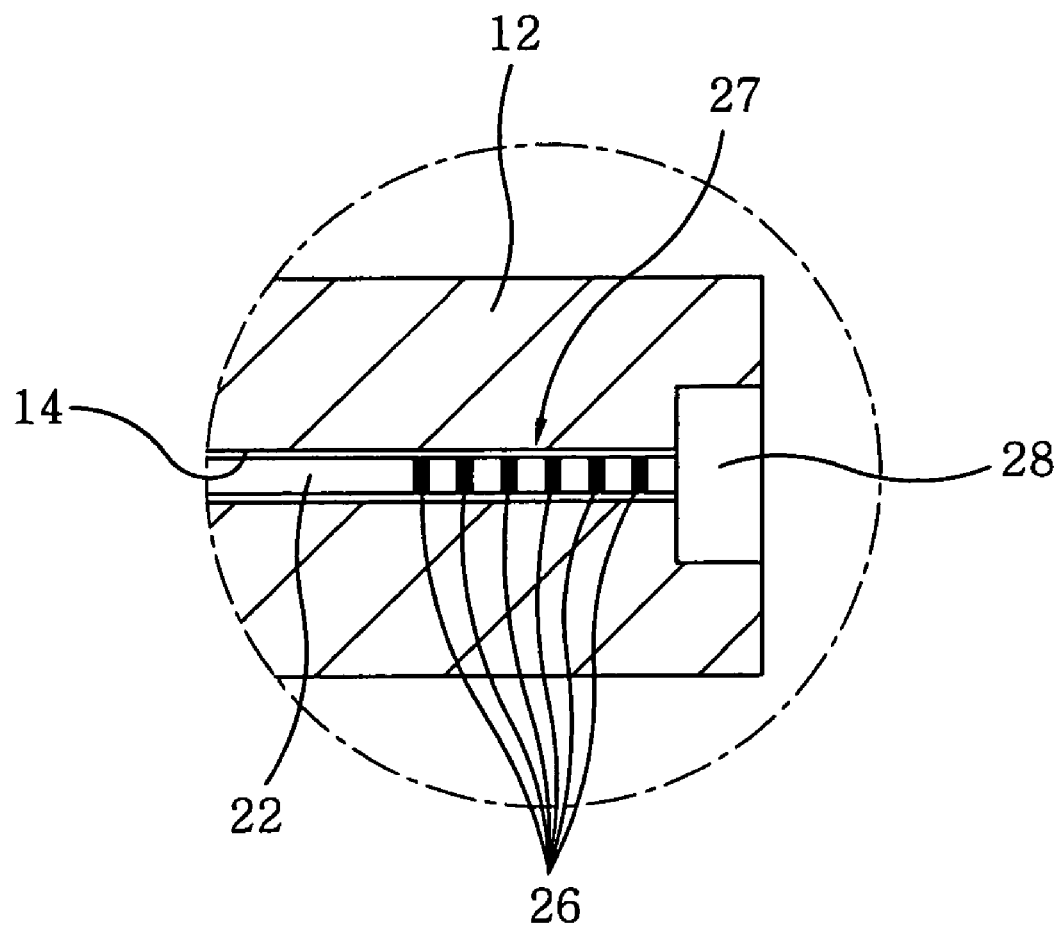
FIG. 2 is an enlarged view of "A" of FIG. 1.

FIG. 1 is a side and partially sectional view showing a schematic constitution wherein a monitoring device for a rotating body, which is constructed in accordance with one embodiment of the present invention, is installed to the rotating body. FIG. 2 is an enlarged view of "A" of FIG. 1. In this embodiment, a rotating body is a cylindrical flywheel. However, the present invention is not limited thereto.

As shown in the figure, rotating shafts 12 are coupled to the central portions of the both ends of a cylindrical flywheel 10. The rotating shaft 12 rotates together with the flywheel 10 while being supported by bearings 18. In order to monitor the flywheel 10 in real time during the rotation, an optical fiber 22 with a plurality of groups of Bragg gratings 24 formed thereon is wound around the flywheel 10 in a spiral shape.

A sensor, which has an optical fiber with a plurality of Bragg gratings formed thereon, i.e., a so-called fiber Bragg grating sensor is known in the art. In the fiber Bragg grating sensor, a plurality of Bragg gratings are formed on a piece of an optical fiber along its lengthwise direction. The fiber Bragg grating sensor utilizes the wavelength variation of the light reflected from each Bragg grating according to ambient temperature or tensile strength and compressive strength. Such a Bragg grating reflects only the light of the wavelength satisfying the Bragg condition (i.e., so-called light of Bragg wavelength) and allows the light of other wavelength to pass therethrough. If an ambient temperature of the Bragg grating varies or a tension or compression is applied to the Bragg grating, then the wavelength of the light reflected from the Bragg grating is varied. As reported, when 1% tension is applied without lowering the strength of the optical fiber, the Bragg wavelength varies in a range of about 12 nm. Further, when 1% compression is applied, the Bragg wavelength varies in a range of about 32 nm. Furthermore, when a temperature variation of 100° C. occurs, the Bragg wavelength varies in a range of about 1.1 nm. Accordingly, it is possible to detect temperature, tension or compression of the part, to which the Bragg grating is provided, by measuring the wavelength of the light reflected from the Bragg grating. Hereinafter, each part of the optical fiber, in which the plural Bragg gratings are provided in a group along the optical fiber 22 wound in a spiral shape around the flywheel 10, is defined as a deformation sensor 25.

The optical fiber 22, which includes a plurality of the deformation sensors 25, is attached to a peripheral surface of the flywheel 10 by means of an epoxy resin, etc. Generally, the optical fiber has a very small diameter and is light, thereby not influencing the rotation operation of the flywheel 10. If so, it can be eliminated by carrying out a balancing process after attaching the optical fiber 22 to the flywheel 10. Alternatively, the optical fiber 22 including a plurality of the deformation sensors 25 may be disposed inside the flywheel 10 when manufacturing the flywheel 10.

The optical fiber 22, which is wound in a spiral shape around the flywheel 10, extends through an insertion hole 14 formed axially throughout the rotating shaft 12 such that its one end is disposed at a central portion of the end of the rotating shaft 12. Adjacent to the one end of the optical fiber 22 is formed in a lengthwise direction a plurality of Bragg gratings 26 other than the Bragg grating 24 of the deformation sensor 25. Herein, this is defined as a reference sensor 27. Both the reference sensor 27 and the deformation sensor 25 are fiber Bragg grating sensors, but their locations and functions are different. Hereinafter, the optical fiber 22 including the deformation sensor 25 and the reference sensor 27 is referred to as "a rotation-side optical fiber".

A fixed body 30, which is provided to be opposed to the rotating shaft 12 and placed apart therefrom, is provided with an optical fiber 32 opposed to the one end of the rotation-side optical fiber (hereinafter referred to as "a fixed-side optical fiber"). The fixed-side optical fiber 32 extends outward of an apparatus including the flywheel 10 and is connected to a signal processing unit 40 for examining whether abnormalities of the flywheel 10 occur. The reason for positioning the fixed-side optical fiber 32 apart from the rotation-side optical fiber 22 is that the rotation-side optical fiber 22 cannot be directly connected to the signal processing unit 40 since it rotates together with the flywheel 10 and the rotating shaft 12. Also, transmitting a light signal via a space can be utilized by such an arrangement. However, when the light signal is transmitted via a space, a transmission loss necessarily occurs. Further, its amount is varied highly according to the rotation angle of the rotating shaft 12, thereby distorting signals from the deformation sensors 25 with respect to the strain occurring in the flywheel 10. The reference sensor 27 compensates such a signal distortion. Since the reference sensor is positioned at the central portion of the rotating shaft 12 and is therefore not affected by the centrifugal force caused by the rotation, the intensity variation of the wavelength reflected from the reference sensor 27 is proportional to the transmission loss variation according to the rotation angle of the rotating shaft 12.

More specifically, the reference sensor 27 reflects a specific wavelength component, which coincides with the characteristic of the reference sensor 27, to the fixed body 30 after receiving a broadband light signal transmitted from the fixed body 30. The signal processing unit 40 of the fixed body 30 analyzes a light quantity of the wavelength component reflected from the reference sensor 27 and calculates an amount of the transmission loss between the rotating shaft 12 and the fixed body 30. During rotation of the rotating shaft 12, the transmission loss is varied according to the rotation angle. Such a variation is equally applied to the deformation sensors 25 disposed on the flywheel 10. Therefore, the signal processing unit 40 calculates an accurate strain variation by compensating the signals from the deformation sensors 25 of the flywheel 10 by use of the transmission loss variation of the reference sensor 27. When the rotating shaft 12 and the flywheel 10 rotates, the reference sensor 27 must measure only the transmission loss according to the rotations and not be affected by the centrifugal force caused by the rotation or not measure the strain caused by a deformation occurring where it is mounted. Consequently, it is preferable that the reference sensor 27 is positioned at an axially central portion of the rotating shaft 12 in order to minimize the centrifugal force caused by the rotation.

On the other hand, since the rotation-side optical fiber 22 and the fixed-side optical fiber 32 have very small diameters, the misalignment of the opposed ends of the rotation-side optical fiber 22 and the fixed-side optical fiber 32 may occur due to vibration caused by the rotation of the rotating shaft 12, thereby causing the signal transmission to be interrupted. In order to prevent this problem, a member 28, which has a collimation function to convert the light signals outputted from the optical fiber to a parallel light ray and a focusing function to the parallel light ray on the optical fiber, is provided at the opposed ends of the rotating shaft 12 and the fixed body 30, respectively. Preferably, a Gradient-Index (GRIN) rod lens or a C-lens is used as such a member.

A light source 34 for emitting a broadband light is connected to the fixed-side optical fiber 32. An optical circulator 36, which transmits the light reflected from the deformation sensor 25 and the reference sensor 27 to the signal processing unit 40, is provided between the fixed-side optical fiber 32 and the light source 34.

Figure 3:
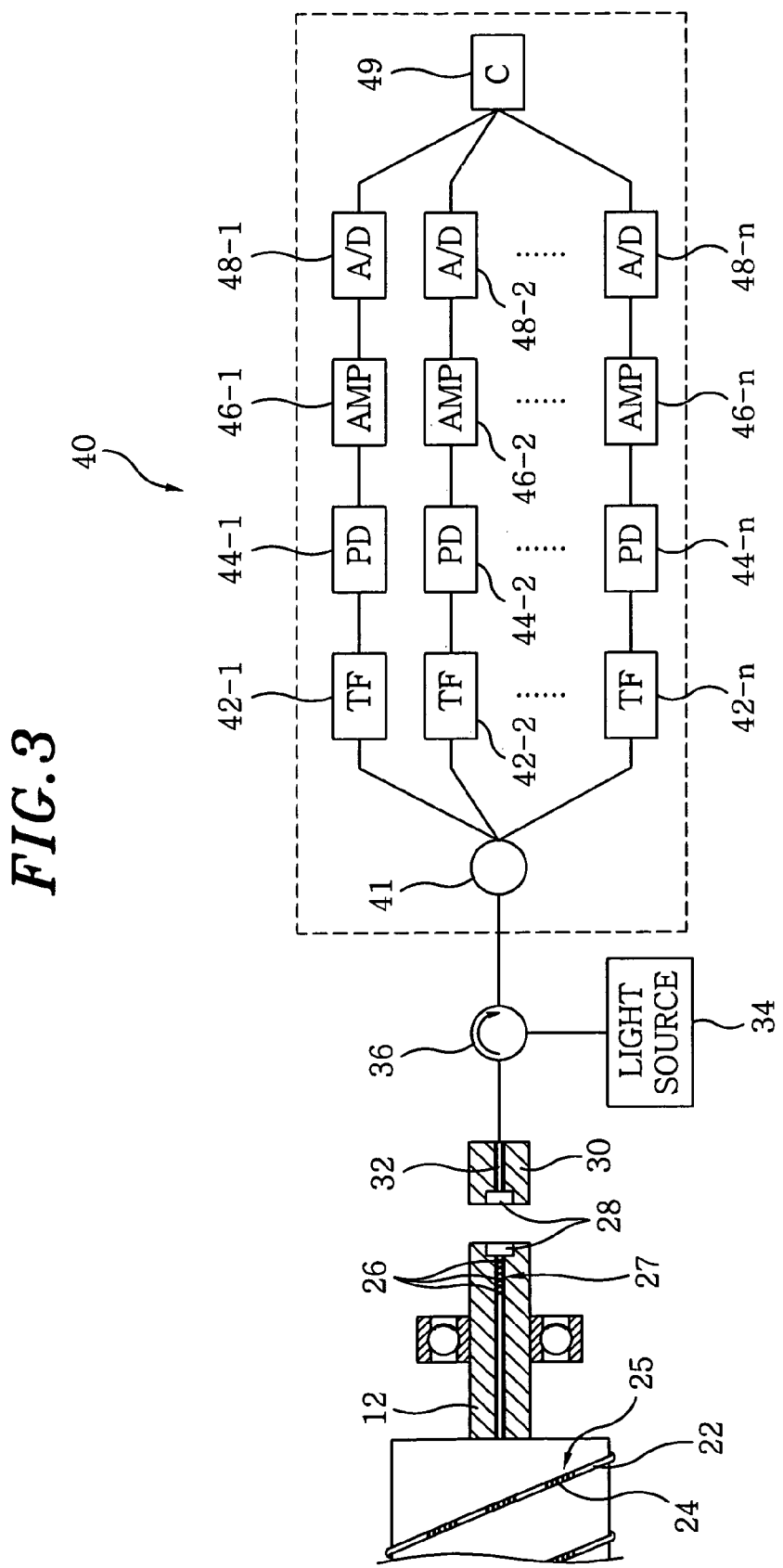
FIG. 3 is a view showing a schematic constitution of a signal processing unit.

FIG. 3 is a view showing a schematic constitution of the signal processing unit 40. As shown therein, the signal processing unit 40 connected to the fixed-side optical fiber 32 is provided with an optical coupler 41, which connects the light reflected from the deformation sensor 25 and the reference sensor 27 to as many signal processing lines as the sensors so that the signals from each sensor can be processed. Further, tunable filters 42-1, 42-2, . . . , 42-n, photo diodes 44-1, 44-2, . . . , 44-n, amps 46-1, 46-2, . . . , 46-n and A/D converters 48-1, 48-2, . . . , 48-n are sequentially connected to each signal processing line connected to the optical coupler 41. Further, an analyzing portion 49 is provided for receiving digital signals outputted from the A/D converters 48-1, 48-2, . . . , 48-n and calculating a pure strain of the rotating body.

Figure 4:
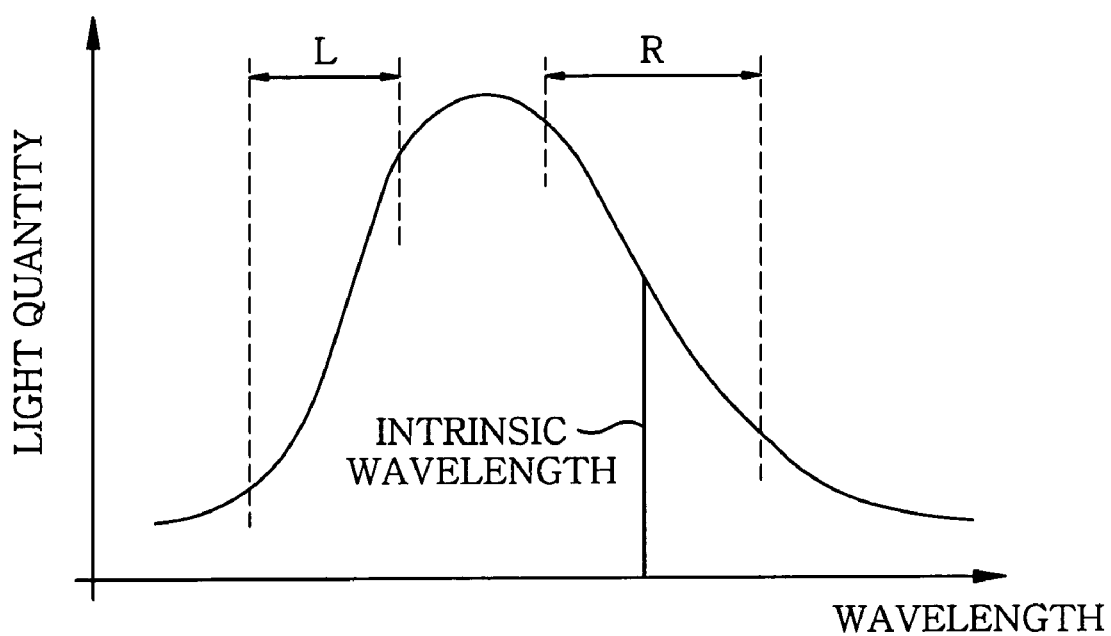
FIG. 4 is a graph showing a light quantity variation with respect to a wavelength variation in a tunable filter of the signal processing unit.

The tunable filters 42-1, 42-2, . . . , 42-n change the wavelength variation of each sensor to the light quantity variation. As shown in FIG. 4, the light quantity variation depending on the wavelength variation shows a bell-shaped characteristic. Since each sensor has its own intrinsic wavelength, as many tunable filters 42-1, 42-2, . . . , 42-n as the sensors are provided so as to correspond to each sensor. Tuning is done by moving the bell-shaped characteristic of each tunable filter 42-1, 42-2, . . . , 42-n right and left according to the intrinsic wavelength of each sensor. For example, tuning can be done such that the intrinsic wavelength of the corresponding sensor is placed at a center of a right sloped region R or at a center of a left sloped region L of the bell-shaped characteristic curve. When the wavelength varies within the right or left sloped region R or L, it is changed to a value of the light quantity variation. The photo diodes 44-1, 44-2, . . . , 44-n serve to change the light quantity variation outputted from the tunable filters 42-1, 42-2, . . . , 42-n to an electrical signal (e.g., voltage). The electrical signal is amplified by the amps 46-1, 46-2, . . . , 46-n and is then changed to the digital signal by the A/D converters 48-1, 42-8, . . . , 48-n. Thereafter, the analyzing portion 49 compensates the signal transmission loss caused by the rotation and the error caused by the temperature variation and calculates the pure strain of the rotating body.

The operation and the functional effects of the above-constituted monitoring device for a rotating body of the present invention will now be described.

If the multi-wavelength light is emitted from the light source 34, then the light passes through the optical circulator 36 and the fixed-side optical fiber 32 and is changed to the parallel light ray through the collimating and focusing member 28 disposed at the end of the fixed body 30 and then advances to the rotating shaft 12. The parallel light ray is focused to the rotation-side optical fiber 22 by the collimating and focusing member 28 disposed at the end of the rotating shaft 12 and is then transmitted to the plural deformation sensors 25.

Among the multi-wavelength lights incident to the deformation sensors 25, only the light of the specific wavelength, which corresponds to the pre-set Bragg grating, is reflected. In case the flywheel 10 is deformed, the wavelength of the reflected light is also varied corresponding to the amount of the lengthwise deformation of the deformation sensor 25. The light reflected from the deformation sensor 25 advances through the rotation-side optical fiber 22 and goes through the reference sensor 27 disposed adjacent to the end of the rotating shaft 12 and is changed to the parallel light ray through the collimating and focusing member 28 disposed at the end of the rotating shaft 12 and then advances to the fixed body 30. The parallel light ray is focused to the fixed-side optical fiber 32 by the collimating and focusing member 28 disposed at the end of the fixed body 30 and passes through the optical circulator 36 and the optical coupler 41. Consecutively, it passes through the tunable filter 42-1, 42-2, . . . , 42-n, the photo diodes 44-1, 44-2, . . . , 44-n, the amps 46-1, 46-2, . . . , 46-n and the A/D converters 48-1, 48-2, . . . , 48-n. The analyzing portion 49 examines whether abnormalities of the flywheel 10 (e.g., deformation) occur.

In the process for detecting the abnormality occurrence of the flywheel 10 (e.g., deformation), since the reference sensor 27 is positioned at the central portion of the rotating shaft 12 and is not affected by the centrifugal force caused by the rotation as described above, the wavelength reflected from the reference sensor 27 remains unchanged, but the intensity variation of the light of such wavelength becomes proportional to the transmission loss variation according to the rotation angle of the rotating shaft 12. Therefore, the signal processing unit 40 measures the transmission loss variation according to the rotation angle of the rotating shaft 12 by measuring the variation in the reference sensor 27 and compensates the signals from the deformation sensors 25 disposed on the flywheel 10, thereby calculating the accurate strain.

Next, the compensation for the transmission loss variation of the signals from the deformation sensors 25 using the reference sensor 27 will now be described. It is assumed that the lowermost line 42-n, 44-n, 46-n 48-n is for the reference sensor and the others are for the deformation sensor among each signal processing line after the optical coupler 41 shown in FIG. 3. When deformation occurs in the rotating body during the rotation, the reflected wavelength in the deformation sensor 25 is varied due to the strain variation occurring where the deformation sensor 25 is attached to the rotating body 25, whereas the reflected wavelength in the reference sensor 27 remains unchanged since the reference sensor is not affected by the strain, as described above. However, when the light reflected from the deformation sensor 25 and the reference sensor 27 is transmitted through the collimating and focusing member 28 from the rotation-side optical fiber 22 to the fixed-side optical fiber 32, the intensity of the light of each wavelength is varied due to the transmission loss variation according to the rotation angle of the rotating body. Such wavelength variation and light intensity variation are changed to the light quantity variation through the tunable filters 42-1, 42-2, . . . , 42-n and is changed to the electrical signal (voltage) through the photo diodes 44-1, 44-2, . . . , 44-n and is then changed to the digital signal by the A/D converters 48-1, 48-2, . . . , 48-n through the amps 46-1, 46-2, . . . , 46-n. If processed as described above, the signal of the reference sensor 27 shows as only the transmission loss variation of the signals according to the rotation angle and the signals of the deformation sensors 25 show as a sum of the deformation occurring where the sensor is attached to the rotating body and the transmission loss of the signals according to the rotation angle. Since the transmission loss variations of the signals according to the rotation angle of the rotating body show the same extent in all the sensors, the strain variation purely measured at each deformation sensor 25 can be obtained by subtracting the signal of the reference sensor 27 from the digitized signal of the deformation sensor 25.

Figure 5A:
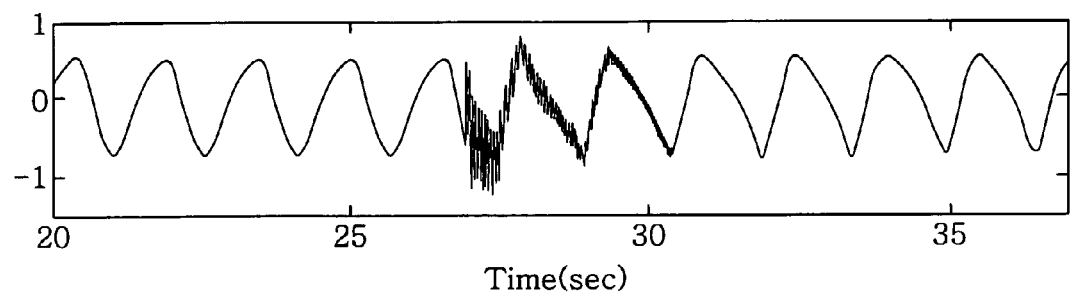
FIGS. 5A to 5C are graphs showing a variation of the signals, which are generated from a deformation sensor and a reference sensor when applying an impact to the rotating body during rotation of the rotating body.
Figure 5B:
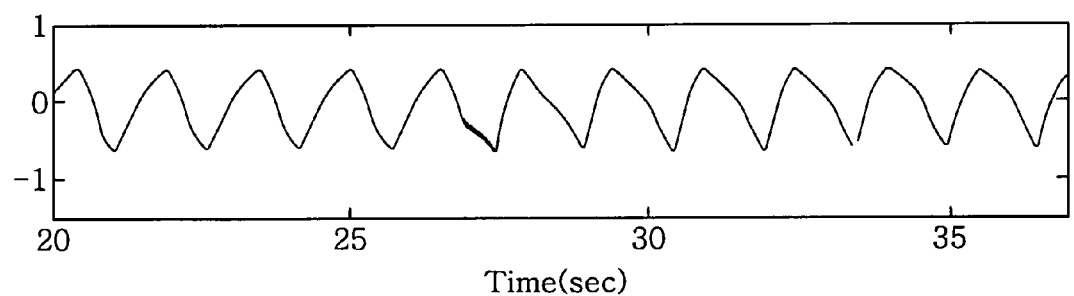
Figure 5C:
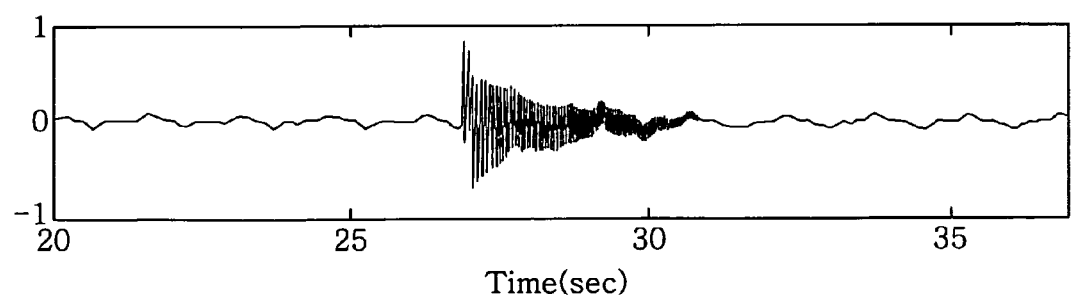

In order to prove the compensation effect for the transmission loss variation of the signal of the deformation sensor 25 using the reference sensor 27 as described above, the present applicant conducted an experiment, wherein the deformation sensor and the reference sensor are disposed on the rotating body and an impact is applied to the rotating body at 27 sec~31 sec during rotation of the rotating body. FIGS. 5A to 5C are graphs showing a result of such an experiment. The graph shown in FIG. 5A shows the signal of the deformation sensor disposed on the rotating body. It shows only the transmission loss variation caused by the rotation first and then shows that the impact signal is added and shows only the transmission loss again when the impact signals disappear. The graph shown in FIG. 5B shows the signal of the reference sensor disposed at the central portion of the rotating shaft. In the experiment, a protection for the impact is not completely made. Therefore, it shows a slight variation during impact, but fairly shows the transmission loss variation caused by the rotation. The graph shown in FIG. 5C is obtained by subtracting the signal of the reference sensor shown in FIG. 5B from the signal of the deformation sensor shown in FIG. 5A. It shows the pure impact signal detected from the deformation sensor.

Figure 6:
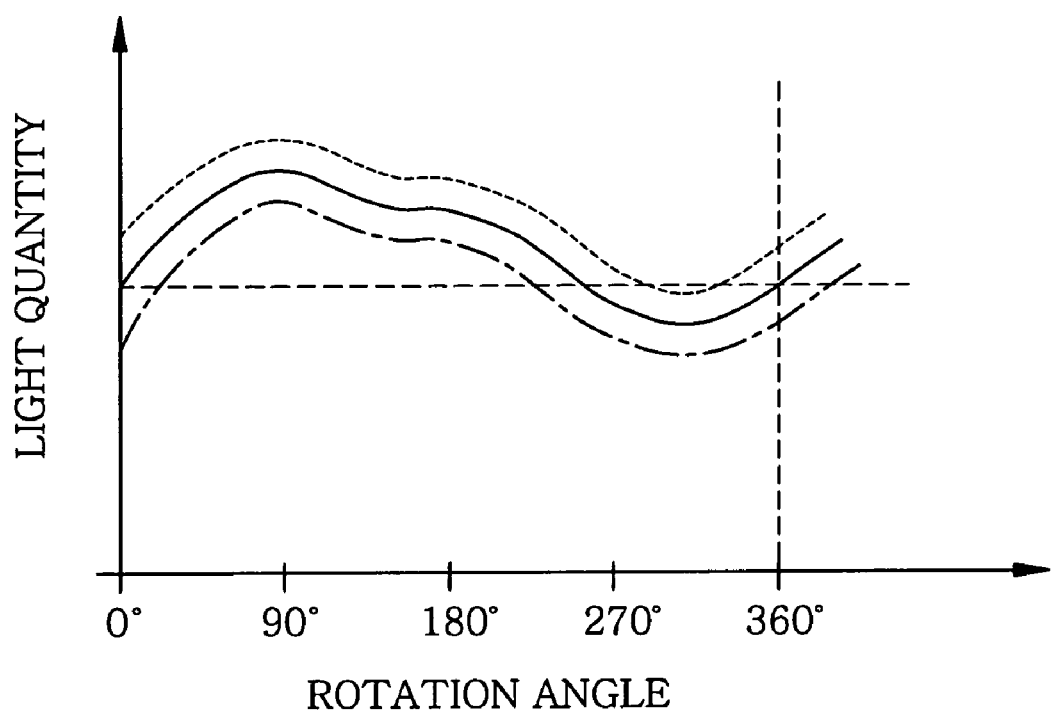
FIG. 6 is a graph showing a variation of the signal generated from the reference sensor according to the ambient temperature variation.

Since the fiber Bragg grating sensor is sensitive to the temperature variation as well as the strain variation, there is a need to compensate errors caused by the temperature variation. For the purpose of temperature compensation, the above-described reference sensor 27 or the fiber Bragg grating sensor other than the reference sensor 27 may be used. A process of temperature compensation using the reference sensor 27 will now be described with reference to FIG. 6. In the signal of the reference sensor 27, the intensity of the light of the wavelength reflected from the reference sensor 27 is varied with a temperature rise when the rotating body does not rotate. This means that the intensity of the signal having passed through the tunable filter 42-n is varied when not considering the transmission loss of the signal caused by the rotation. However, it actually shows as joined to the transmission loss variation of the signal caused by the rotation of the rotating body, which causes the curve to be moved up or down as shown with a dotted line and a one-dot chain line in FIG. 6. This is because the temperature rise is added to the existing output of the tunable filter 42-n according to the rotation angle. The transmission loss variation of the signal caused by the rotation of the rotating body remains constant according to time. Further, the upward or downward movement of the curve is made equally throughout the rotation angle of 0°~360°. Therefore, in case of assuming that the ambient temperature is constant and the temperatures of all the deformation sensors 25 and the reference sensor 27 are the same during measuring the deformation of the rotating body, if the temperature is varied after measuring the amount of the transmission loss variation caused by the rotation by means of the reference sensor 27 at any pre-set reference temperature, the signal of the reference sensor 27 has the variation amount according to the temperature variation in addition to the transmission loss variation caused by the rotation angle variation. If the same temperature variation occurs in all the deformation sensors 25 attached to the rotating body, the variation amount caused by the rotation and the temperature variation can be compensated at a time by subtracting the signal of the reference sensor 27 from the signal of the deformation sensor 25. This is because the variation amount of the signal of the deformation sensor 25 according to the temperature variation is the same as that of the signal of the reference sensor 27.

Figure 7:
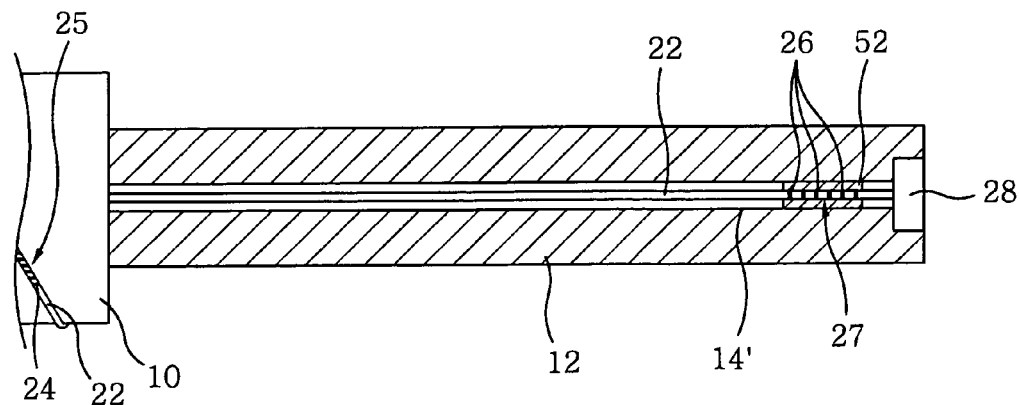
FIG. 7 is a side and partially sectional view showing a schematic constitution wherein a monitoring device for a rotating body, which is constructed in accordance with other embodiment of the present invention, is installed to the rotating body.
Figure 8:
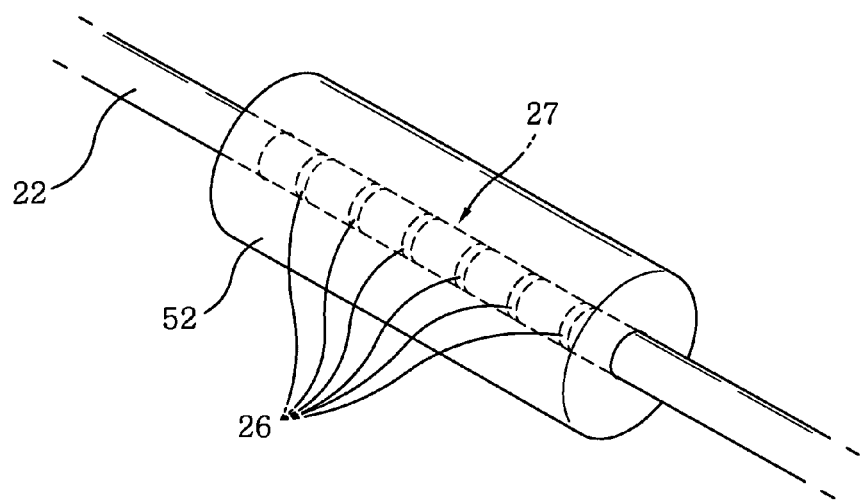
FIG. 8 is a perspective view showing a reference sensor of FIG. 7.

FIG. 7 is a side and partially sectional view showing a schematic constitution wherein a monitoring device for a rotating body, which is constructed in accordance with another embodiment of the present invention, is installed to the rotating body. FIG. 8 is a perspective view showing a reference sensor of FIG. 7.

The embodiment described with reference to FIG. 1 is configured such that the rotation-side optical fiber 22 is positioned to pass through the insertion hole 14 formed in the central portion of the rotating shaft 12 along its axial direction. The rotating shaft 12 is usually made from a material having high hardness. Therefore, it is very difficult or impossible to form an optical fiber insertion hole inside the rotating shaft 12 so that it corresponds to the diameter of the optical fiber. If the optical fiber insertion hole is formed more than the diameter of the optical fiber 22, then the reference sensor 27 is not secured inside the insertion hole. Therefore, there can be a problem in that the reference sensor is affected by the centrifugal force during rotation of the rotating shaft 12 and the accurate error compensation is not made thereby. In order to solve such a problem, the central portion of the rotating shaft 12 is formed with an insertion hole 14' having a bigger diameter than that of the optical fiber 22. A cylindrical packing member 52 is provided to wrap the reference sensor 27 so that the reference sensor 27 is certain to be secured to the inside the insertion hole 14' having a bigger diameter than that of the reference sensor 27. In order to minimize the deformation of the reference sensor 27, which may occur during rotation of the rotating shaft 12, the packing member 52 is made from a material having high hardness. Since the reference sensor 27 is placed to pass through an axial central portion of the cylindrical packing member 52 and the diameter of the packing member 52 is set to be equal to or slightly smaller than that of the insertion hole 14' the reference sensor 27 is allowed to be placed on the center of the rotating shaft 12 and therefore is not affected by the centrifugal force.

Figure 9:
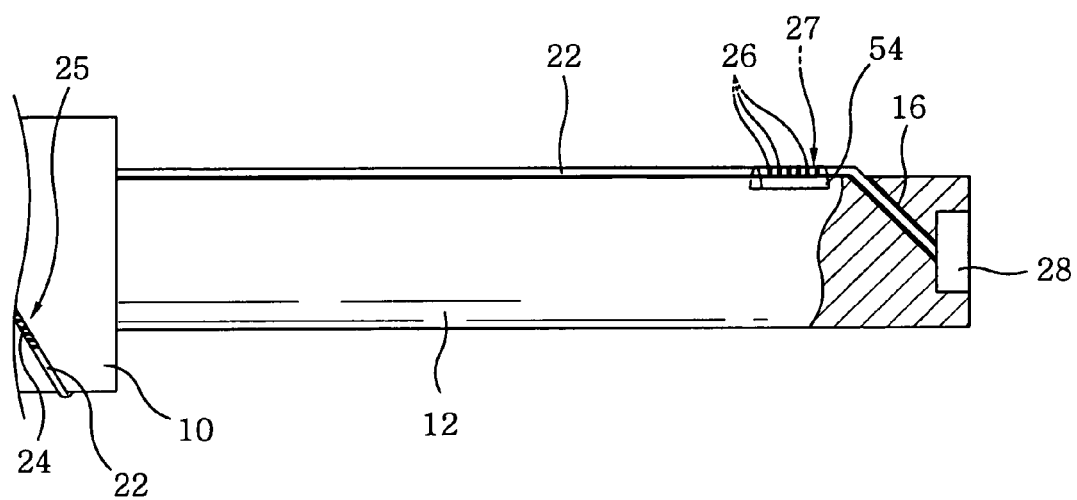
FIG. 9 is a side and partially sectional view schematically showing a constitution wherein a monitoring device for a rotating body, which is constructed in accordance with another embodiment of the present invention, is installed to the rotating body.
Figure 10A:
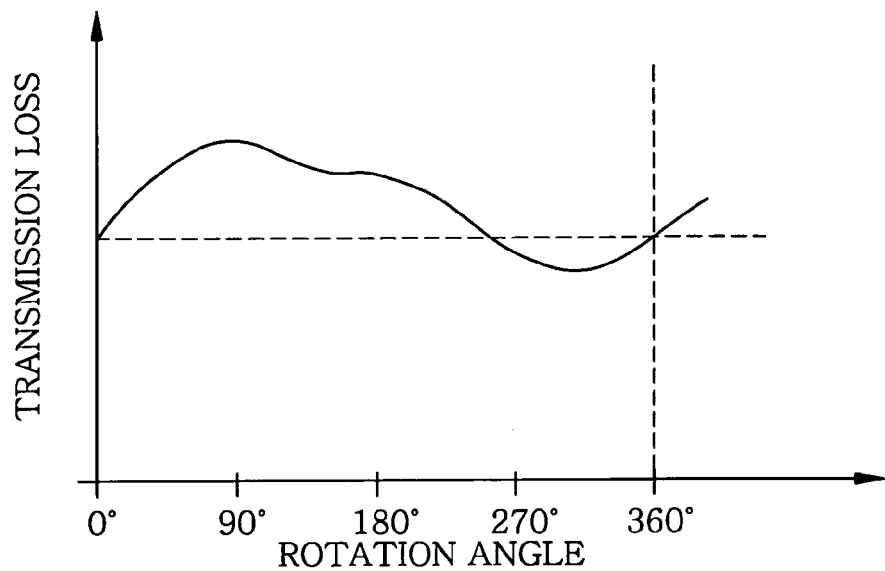
FIGS. 10A and 10B are graphs showing a transmission loss variation of the signal from a fiber Bragg grating sensor according to the rotation angle variation of the rotating body.
Figure 10B:
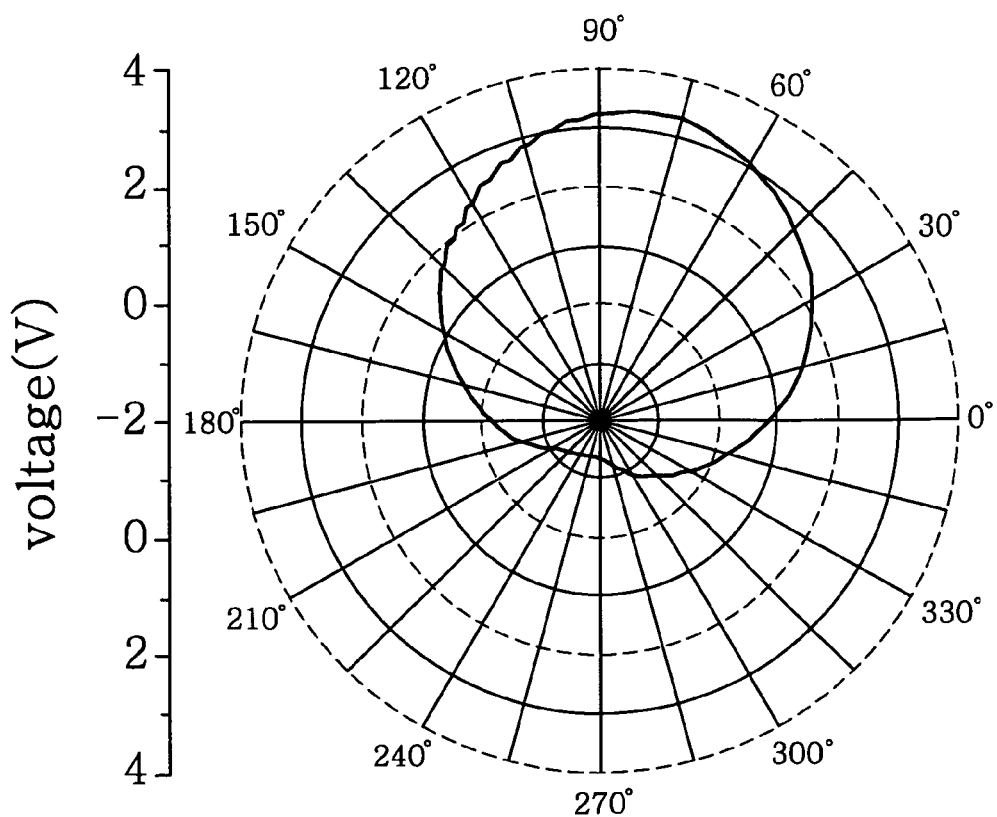

FIG. 9 is a side and partially sectional view showing a schematic constitution wherein a monitoring device for a rotating body, which is constructed in accordance with another embodiment of the present invention, is installed to the rotating body.

When the rotating shaft 12 is not supported by any bearing or is not required even to be supported, it is not required that the central portion of the rotating shaft 12 is formed in its axial direction with the optical fiber insertion hole. In such a case, the rotating shaft 12 is formed with an insertion hole 16, which is slantingly formed from the peripheral surface of the rotating shaft 12 adjacent to the end of the rotating shaft to the center of the end of the rotating shaft 12, as shown in FIG. 9. If so, the rotation-side optical fiber 22, which is extended as attached to the flywheel 10, runs toward the end of the rotating shaft 12 as attached to the peripheral surface of the rotating shaft 12 and then goes through the insertion hole 16, which is in communication with the peripheral surface of the rotating shaft 12, to be connected to the collimating and focusing member 28, which is provided at the center of the end of the rotating shaft 12. In such a case, the reference sensor 27 is positioned just before the insertion hole 16 which the rotation-side optical fiber 22 enters. In order to prevent the reference sensor 27 from being deformed by the centrifugal force caused by the rotation of the rotating shaft 12, the reference sensor 27 is secured to the peripheral surface of the rotating shaft 12 as wrapped by a film-like packing member 54. The film-like packing member 54, which is employed in the present invention, serves to protect the reference sensor 27 from the deformation of the rotating shaft 12.

As discussed above, since the reference sensor 27 must measure the transmission loss variation according to the rotation of the rotating body, the reference sensor 27 must be as free as possible from the strain variation occurring where the reference sensor 27 is provided. Accordingly, in case that the reference sensor 27 is provided in such a way that the cylindrical or film-like packing members wraps it, the packing member must be made from a material having a very high hardness, thereby minimizing the deformation of the reference sensor 27.

It is preferable that the reference sensor 27 is positioned at the center of the rotating shaft 12 in order to minimize the effect caused by the centrifugal force, as shown in FIG. 7. If such positioning is impossible, however, the reference sensor 27, which is configured to be wrapped by the packing member, is placed apart from the surface of the rotating shaft or a portion of such configured reference sensor is placed on the surface of the rotating shaft in a point contact manner. This is so that the reference sensor becomes free from the strain variation of the surface of the rotating shaft.

The configuration regarding to positioning the rotation-side optical fiber is not limited to the configuration described with reference to FIGS. 1, 7 and 9. It will be appreciated that various modifications can be possibly made.

The fiber Bragg grating sensor is sensitive to the temperature variation as well as the strain variation. It has been described that the reference sensor 27 further has the function of a temperature sensor in order to compensate errors caused by the temperature variation. However, if the temperature variations of the parts, at which the deformation sensors are attached to the rotating body respectively, are different from each other, Bragg grating temperature sensors must be further provided adjacent to each deformation sensor, at which a temperature measurement is required. In such a case, the Bragg grating temperature sensor must show only the temperature variation and not be subjected to the strain variation of the surface of the rotating body. To this end, the Bragg grating temperature sensor is wrapped by the packing member as is the case with the deformation sensor. Further, the signal processing unit 40 must be further provided with another signal processing line (i.e., a tunable filter—a photo diode—an amp—an A/D converter) for processing the signal corresponding to the light reflected from the Bragg grating temperature sensor.

As described above in detail, a monitoring device for a rotating body according to the present invention is configured such that the fiber Bragg grating sensor is mounted to the rotating body. The monitoring device for a rotating body according to the present invention is further configured such that an optical fiber, which transmits and receives a light to and from the fiber Bragg grating sensor, is mounted to a fixed body, which is placed adjacent to the rotating body as spaced apart therefrom, by using the characteristic for a light signal to be capable of being transmitted via a space. Therefore, it can be monitored in real time during operation of the rotating body irrespective of the rotational operation of the rotating body whether abnormality of the rotating body (e.g., deformation) occurs.

Further, as for the fiber Bragg grating sensor, the deformation sensor, which directly measures the deformation of the rotating body, and the reference sensor, which is not affected by the deformation caused by the rotation of the rotating body, are separately provided. Therefore, the transmission loss of the signals according to the rotation angle of the rotating body can be compensated and therefore the deformation of the rotating body can be detected accurately. Moreover, since the reference sensor is configured to have a function of a temperature sensor, the measurement errors of the sensors, which are caused by the ambient temperature variation of the rotating body, can be compensated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A monitoring device for a rotating body, the rotating body rotatably provided apart from a fixed body, comprising:
    a light source for emitting light;
    a rotation-side optical fiber attached to a deformation-measuring part of the rotating body and being extended toward one end of the rotating body so that one end of the rotation-side optical fiber is placed on a rotational axis of the rotating body;
    at least one deformation sensor made by forming a plurality of Bragg gratings in a portion of the rotation-side optical fiber along its lengthwise direction, the portion of the rotation-side optical fiber being attached to the deformation-measuring part of the rotating body;
    a reference sensor made by forming a plurality of Bragg gratings in the rotation-side optical fiber along its lengthwise direction adjacent to the one end of the rotation-side optical fiber placed at the one end of the rotating body;
    a fixed-side optical fiber connected to the light source and being mounted to the fixed body so as to be opposed to the one end of the rotation-side optical fiber; and
    a signal processing unit connected to the fixed-side optical fiber, the signal processing unit receiving the light reflected from the deformation sensor and the reference sensor, the signal processing unit detecting a deformation of the rotating body by subtracting a signal corresponding to the light reflected from the reference sensor from a signal corresponding to the light reflected from the deformation sensor.

2. The monitoring device of claim 1, wherein the reference sensor is disposed on the rotational axis of the rotating body.

3. The monitoring device of claim 1, wherein the reference sensor is disposed on a surface of the rotating body.

4. The monitoring device of claim 2, wherein the reference sensor is wrapped by a packing member, the packing member preventing the reference sensor from being deformed by a rotation of the rotating body.

5. The monitoring device of claim 3, wherein the reference sensor is wrapped by a packing member, the packing member preventing the reference sensor from being deformed by a rotation of the rotating body.

6. The monitoring device of claim 1, wherein the signal processing unit includes:
    an optical coupler for receiving the light reflected from the deformation sensor and the reference sensor;
    a plurality of signal processing lines connected to the optical coupler, each signal processing line processing signals corresponding to the light reflected from the deformation sensor and the reference sensor; and
    a calculating portion for calculating a strain of the rotating body by subtracting the signal of the reference sensor from the signal of the deformation sensor outputted from the plurality of the signal processing lines.

7. The monitoring device of claim 1, wherein the monitoring device further comprises at least one temperature sensor, the temperature sensor being made by forming a plurality of Bragg gratings on a portion of the rotation-side optical fiber along its lengthwise direction.

8. The monitoring device of claim 7, wherein the reference sensor is combined with the temperature sensor.

9. The monitoring device of claim 7, wherein the temperature sensor is disposed on the rotational axis center of the rotating body.

10. The monitoring device of claim 7, wherein the temperature sensor is disposed on a surface of the rotating body adjacent to the deformation sensor.

11. The monitoring device of claims 7, wherein the temperature sensor is wrapped by a packing member, the packing member preventing the temperature sensor from being deformed by a rotation of the rotating body.

12. The monitoring device of claims 8, wherein the temperature sensor is wrapped by a packing member, the packing member preventing the temperature sensor from being deformed by a rotation of the rotating body.

13. The monitoring device of claims 9, wherein the temperature sensor is wrapped by a packing member, the packing member preventing the temperature sensor from being deformed by a rotation of the rotating body.

14. The monitoring device of claim 7, wherein the signal processing unit includes:
   an optical coupler for receiving the light reflected from the deformation sensor, the reference sensor and the temperature sensor;
   a plurality of signal processing lines connected to the optical coupler, each signal processing line processing signals corresponding to the light reflected from the deformation sensor, the reference sensor and the temperature sensor; and
   a calculating portion for calculating a strain of the rotating body by subtracting the signal of the reference sensor and the signal of the temperature sensor from the signal of the deformation sensor outputted from the plurality of the signal processing lines.

15. The monitoring device of claim 6, wherein the signal processing line includes:
   a tunable filter for changing the wavelength variations of the sensors to the light quantity variations;
   a photo diode for changing the light quantity variation outputted from the tunable filter to an electrical signal;
   an amp for amplifying the electrical signal; and
   an A/D converter for converting the amplified electrical signal to a digital signal and outputting the digital signal to the calculating portion.

16. The monitoring device of claim 14, wherein the signal processing line includes:
   a tunable filter for changing the wavelength variations of the sensors to the light quantity variations;
   a photo diode for changing the light quantity variation outputted from the tunable filter to an electrical signal;
   an amp for amplifying the electrical signal; and
   an A/D converter for converting the amplified electrical signal to a digital signal and outputting the digital signal to the calculating portion.

* * * * *